Dec. 2, 1924. 1,517,985

F. H. HASKELL

PRESSURE GAUGE

Filed Feb. 18, 1924

Inventor:
Frank H. Haskell,
by Walter E. Lombard,
Atty.

Patented Dec. 2, 1924.

1,517,985

UNITED STATES PATENT OFFICE.

FRANK H. HASKELL, OF BOSTON, MASSACHUSETTS, ASSIGNOR TO GEORGE H. MUSGRAVE, OF ARLINGTON, MASSACHUSETTS.

PRESSURE GAUGE.

Application filed February 18, 1924. Serial No. 693,468.

*To all whom it may concern:*

Be it known that I, FRANK H. HASKELL, a citizen of the United States of America, and a resident of Boston, in the county of Suffolk, in the State of Massachusetts, have invented certain new and useful Improvements in Pressure Gauges, of which the following is a specification.

This invention relates to pressure gauges and has for its object the production of a device of this character particularly adapted to show low readings of pressure upon the dial thereof.

The invention consists in providing the free end of the usual Bourdon spring with an adjustable arm which extends between two posts projecting inwardly from the back of the gauge casing, which arm will contact with one of said posts at the end of a predetermined movement of the gauge pointer thereby stiffening the Bourdon spring and causing a slower movement of the pointer when it moves beyond said predetermined point.

The invention further consists in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Of the drawings—

Similar characters indicate like parts throughout the several figures of the drawings.

Figure 1:
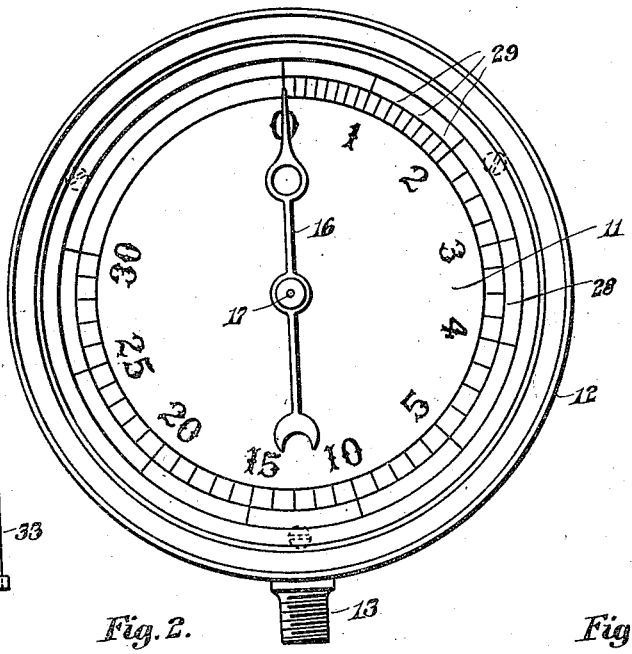
Figure 1 represents a front elevation of a pressure gauge embodying the principles of the present invention.
Figure 4:
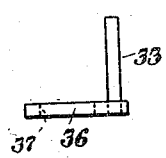
Figure 4 represents a side elevation of one of the adjustable posts.
Figure 2:
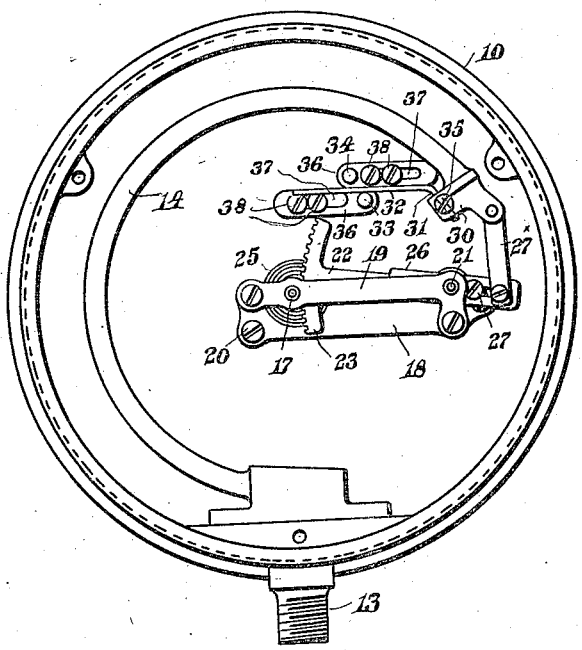
Figure 2 represents a similar view with the glass front dial face and indicator thereof removed.
Figure 3:
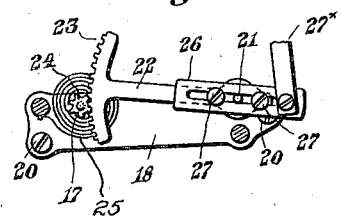
Figure 3 represents a sectional detail to be hereinafter described.

In the drawing 10 is a casing having secured therein a dial plate 11 over which is a glass held in position by an annular member 12 screwed to the casing 10 all in the usual manner.

Extending from the casing 10 is a threaded tubular member or nipple 13 which is adapted to be connected to any system, the pressure of which it is desired to ascertain.

The inner end of this tubular member or nipple 13 communicates with a Bourdon spring 14 which in the present invention is made much lighter than the same springs ordinarily used in pressure gauges and therefore is more susceptible to changes in pressure.

In ordinary pressure gauges the spring 14 is so stiff that it will indicate 15 pounds pressure at the point marked 5 on the dial 11 of the pressure gauge shown and described herein.

This permits very low pressures to be clearly indicated when the present invention is in use.

The indicating mechanism is substantially the same as is used in ordinary gauges, the indicator or pointer 16 being secured to a spindle 17 centrally located in the casing 10. This spindle 17 has bearings in the base plate 18 and top plate 19 and is adapted to be oscillated in said bearings.

The base plate 18 is secured by screws 20 to the inner face of the back wall of the casing 10 and this base plate 18 and top plate 19 have other bearings for a second spindle 21 to which is secured the arm 22 of a segment 23 the teeth of which mesh with a pinion 24 on the spindle 17.

A spiral spring 25 secured at one end to said spindle 17 and at the other end to a post between the top plate 19 and base plate 18 normally retains the pointer 16 in register with the point marked 0 on the dial 11.

A slotted member 26 is secured to the arm 22 by screws 27 a portion of said arm extending beyond the spindle 21 and having pivotally connected to its outer end one end of a link 27$^x$ the opposite end of which is pivotally connected to the free end of the spring 14.

As thus far described the construction of the gauge is substantially the same as many gauges in general use with the exception that a lighter spring 14 is used and the dial plate 11 is provided with a graduated scale extending from 0 to 30 with the 30 mark more than three quarters way around the scale or opposite to the mark 3 all as shown in Fig. 1.

When installing the gauge the slotted member 26 is adjusted so that when the spring 14 is subjected to five pounds pressure it will move the pointer 16 to the point on the scale 28 marked 5.

In other words the distance travelled by the pointer 16 to record fifteen pounds pressure in the ordinary pressure gauge in the present instance travels the same distance to indicate a pressure of only five pounds thereby making it possible to provide the scale 28 with a plurality of subdivisions 29 so that very low pressures may be clearly and accurately read.

The principal invention resides in the means employed to stiffen the spring 14 and retard the pointer 16 when said pointer passes the point marked 5 so that in indicating ten pounds pressure the pointer while travelling from the 5 point to the 10 point will travel only one fifth of the distance that it travels in indicating the first five pounds pressure.

To accomplish this the free end of the spring 14 is provided with an inwardly extending boss 30 having a hole extending transversely thereof substantially parallel with the inner wall of the spring at that point.

In this hole is disposed the shorter arm 31 of a bent rod 32 the longer arm of which extends between two posts 33, 34 extending from the back wall of the casing 10 toward the front of the gauge.

The short arm 31 of rod 32 may be adjusted in the hole in boss 30 and secured in adjusted position by set screw 35.

The posts 33, 34 are each provided with a separate slotted base 36 through the slot 37 of which headed screws 38 extend into the back wall of the casing 10.

By means of this construction the posts 33, 34 may be moved toward and from the free end of the spring 14 so that they may be made to bear upon different points of the rod 32 in order to regulate the travel of the pointer when the retarding point has been reached.

These posts 33, 34 may be adjusted independently of each other as is self-evident.

Normally the rod 32 bears against the post 33 and when the spring 14 is moved to indicate pressure the rod 32 will move therewith but will not come into contact with the post 34 until the pointer 16 reaches the mark 5 to indicate the presence of five pounds pressure.

When a greater amount of pressure is obtained the rod 32 will bear against the post 34 thereby stiffening the spring 14 and retarding the movement of the indicator or pointer 16 and causing it to travel slower along the scale 28.

When installing the gauge the posts 33, 34 are adjusted to give the proper readings beyond the point 5 and when once adjusted no further adjustment is required.

By means of the gauge herein shown and described very low pressures may be read without interfering with the indication of the higher pressures.

The retarding mechanism is very simple in construction, inexpensive to manufacture and yet very effective in operation.

It is believed that the operation and many advantages of the invention will be apparent without further description.

Having thus described my invention, I claim:

1. The combination in a gauge provided with an indicating mechanism; an arcuate tubular spring adapted to be actuated by pressure delivered thereto; operative connections between said mechanism and spring; an arm secured to the inner side of the free end of said tubular spring; and a rigid post in the path of said arm with which the side of said arm is adapted to contact after a predetermined movement thereof.

2. The combination in a gauge provided with an indicating mechanism; an arcuate tubular spring adapted to be actuated by pressure delivered thereto; operative connections between said mechanism and spring; an arm secured to the inner side of the free end of said tubular spring and removable therefrom; and a rigid post in the path of said arm with which the side of said arm is adapted to contact after a predetermined movement thereof.

3. The combination in a gauge provided with an indicating mechanism; an arcuate tubular spring adapted to be actuated by pressure delivered thereto; operative connections between said mechanism and spring; an arm secured to the inner side of the free end of said tubular spring; and a rigid post in the path of said arm with which the side of said arm is adapted to contact after a predetermined movement thereof said post being adjustably secured to the gauge casing.

4. The combination in a gauge provided with an indicating mechanism; an arcuate tubular spring adapted to be actuated by pressure delivered thereto; operative connections between said mechanism and spring; an arm secured to the free end of said tubular spring and extending inwardly therefrom; and two rigid posts with which the sides of said arm are adapted to contact after a predetermined movement in either direction.

5. The combination in a gauge provided with an indicating mechanism; an arcuate tubular spring adapted to be actuated by pressure delivered thereto; operative connections between said mechanism and spring; an arm secured to the free end of said tubular spring and extending inwardly therefrom; and two rigid posts with which the sides of said arm are adapted to contact after a predetermined movement in either direction, said posts being adjustably mounted on the inner face of the back of the gauge casing.

6. The combination in a gauge provided with an indicating mechanism; an arcuate tubular spring adapted to be actuated by pressure delivered thereto; operative connections between said mechanism and spring; an arm secured in a projection extending inwardly from the free end of said tubular spring and adjustable endwise therein; and a rigid post in the path of said arm with which said arm is adapted to contact after a predetermined movement thereof.

7. The combination in a gauge provided with an indicating mechanism; an arcuate tubular spring adapted to be actuated by pressure delivered thereto; operative connections between said mechanism and spring; an inwardly extending arm secured to the free end of said tubular spring; and a post in the path of said arm with which said arm is adapted to contact after a predetermined movement thereof.

8. The combination in a gauge provided with an indicating mechanism; an arcuate tubular spring adapted to be actuated by pressure delivered thereto and having at its free end a lateral boss extending inwardly and provided with a transverse hole therethrough; operative connections between said mechanism and spring; a bent arm one portion of which is secured in said hole; and a post in the path of other portion of said arm and with which said arm is adapted to contact.

Signed by me at 746 Old South Building, Boston, Massachusetts, this 16th day of February, 1924.

FRANK H. HASKELL.

Witnesses:
WALTER E. LOMBARD,
NATHAN C. LOMBARD.